Jan. 6, 1959      A. A. HUTCHINS      2,867,142
TOOLS FOR RELEASING SPEED NUTS
Filed Feb. 25, 1957      2 Sheets-Sheet 1
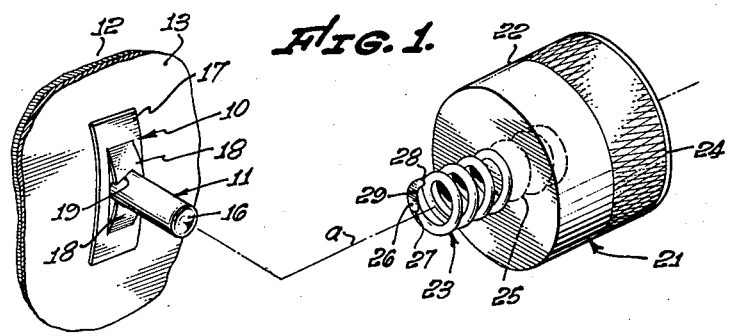
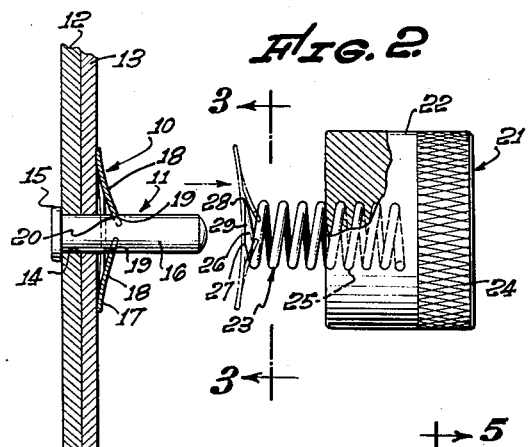
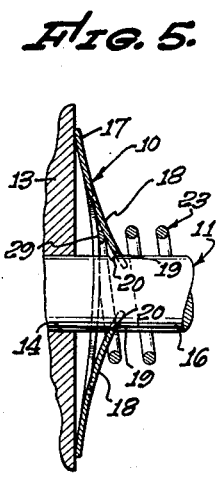
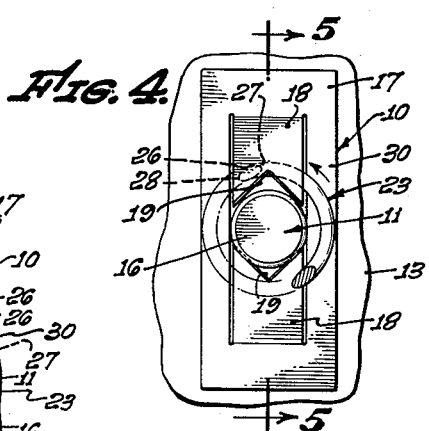
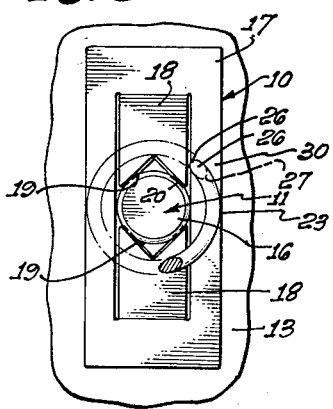
ALMA A. HUTCHINS,
INVENTOR.
BY *(signature)*
ATTORNEY.

Jan. 6, 1959 A. A. HUTCHINS 2,867,142
TOOLS FOR RELEASING SPEED NUTS
Filed Feb. 25, 1957
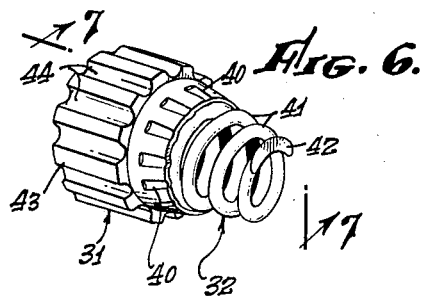
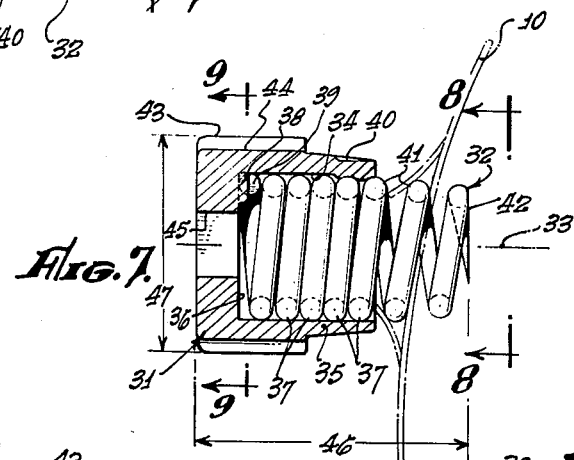
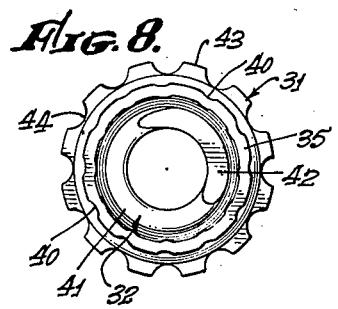
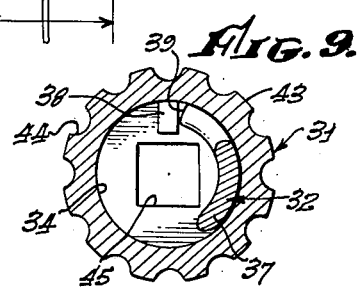
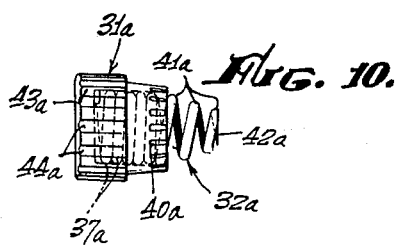
ALMA A. HUTCHINS,
INVENTOR.
BY H Calvin White
ATTORNEY.

United States Patent Office 2,867,142
Patented Jan. 6, 1959

2,867,142

TOOLS FOR RELEASING SPEED NUTS

Alma A. Hutchins, Pasadena, Calif., assignor to George J. Blacher, Pasadena, Calif.

Application February 25, 1957, Serial No. 642,301

13 Claims. (Cl. 81—3)

This invention relates to improved tools for removing from about a stem a fastener element of the type known in the trade as "Tinnerman nuts," and commonly employed in fastening parts to automobile bodies, radio chassis, and the like. This application is a continuation in part of my copending application Serial No. 389,306, filed October 30, 1953, on "Nut Releasing Tools and Methods," now abandoned.

In automobile body work, and in various other fields, it is customary to employ a self-locking type of fastener or "Tinnerman nut," including a small piece of sheet metal adapted to be easily slipped onto the stem of a mating headed fastener element, and to tightly grip that stem in a manner positively retaining the two parts together. This sheet metal fastener or nut has a pair of angularly turned holding portions, which bite into the engaged stem at an angle such that any tendency for outward movement of the nut along the stem normally has the effect of increasing the depth of bite and thus more positively locking the nut against removal from the stem. This self-locking effect is of course extremely desirable for assuring positive setting of the nut about the stem, but has the disadvantage that it renders very difficult the removal of the nut from the stem with conventional tools.

The general object of the present invention is to provide a new type of tool which will act to very simply and easily release one or both of the locking portions of such a fastener or nut, and to then pull the nut off of the stem. Structurally, this tool includes a handle and a helical spring-like member carried by the handle and adapted to be received and rotated about the end of the stem. This helical member has an outer end portion forming a work engaging finger, which acts to engage and release the nut upon rotation of the tool. This end portion extends essentially transversely of the axis of the tool, and is preferably tapered toward its extremity, so that upon rotation of the tool, the end portion is received beneath one of the stem gripping or locking portions of the nut and axially between that portion and the base of the nut, to release the nut for easy removal from about the stem. The taper and conformation of the end portion of the work engaging member is such that this portion serves in effect as a rotary wedge, which acts upon rotation of the tool to positively wedge the locking portion of the nut and the base portion axially apart, to thereby release the nut from the stem. To assure proper engagement with the base of the nut the end portion of the tool has an outwardly facing base engaging surface which extends at a reduced helical pitch as compared with the rest of the member, and which preferably extends at substantially zero pitch. For best results this surface is planar and extends directly transversely of the axis of the coiled member.

Certain particular features of the invention have to do with the formation of the handle of the device and its manner of connection to the helical member. In one form of the invention, the handle contains a recess within which an inner coiled end portion of the helical member is received, to be held therein by crimping of the handle against the member. Preferably, the portion of the member which is within the handle is closely wound, while the work engaging portion has its turns spaced apart. Also, the handle engaging portion may be of uniform diameter, with the work engaging portion being of progressively decreasing diameter, in which case the handle can be crimped against the helical member near the point of juncture between its uniform and non-uniform diameter portions. A shoulder in the handle recess may serve to prevent rotation of a helical member. Further, an end wall of the handle may be provided with a polygonal recess for engagement with a wrench to turn the tool. In order to facilitate use of the tool in locations of small clearance, the overall axial length of the tool should be as small as possible, preferably not greater than about twice the maximum transverse dimension of the tool.

The above and other features and objects of the present invention including certain features having to do with the more specific structural details of the device, will be better understood from the following detailed description of the typical embodiments illustrated in the accompanying drawings, in which:

Fig. 1 is a perspective view of a Tinnerman nut, and a first form of tool constructed in accordance with the invention for removing the nut from an engaged stem;

Fig. 2 is a partially sectional view through the nut, engaged stem, and tool of Fig. 1;

Fig. 3 is an enlarged view of the nut and engaged stem, taken on line 3—3 of Fig. 2, and showing the nut in its active position;

Fig. 4 is a view corresponding to Fig. 3, but showing the nut with one of its stem gripping fingers released by the tool of the present invention;

Fig. 5 is a fragmentary section taken on line 5—5 of Fig. 4;

Fig. 6 is a perspective view of a variational form of tool embodying the invention;

Fig. 7 is an axial section, taken essentially on line 7—7 of Fig. 6;

Fig. 8 is a transverse view taken on line 8—8 of Fig. 7;

Fig. 9 is a transverse section taken on line 9—9 of Fig. 7; and

Fig. 10 is a side view of another form of the invention which is slightly different from that of Figs. 6 to 9.

In the drawings, I have shown at 10 a fastener element of the type known in the trade as a Tinnerman nut. This nut coacts with a mating fastener element 11, the two parts typically being employed for securing together a pair of adjacent sheet metal elements 12 and 13 containing registering openings 14. Element 11 has a head 15 engaging an outer side of one of the sheets 12, and from which projects a cylindrical stem 16 for engagement with nut 10.

The nut 10 is formed of an outwardly bowed essentially rectangular piece of spring steel 17, having a central opening through which stem 16 projects. At opposite sides of the stem passing opening of nut 10, the material of this nut is stamped outwardly to form a pair of angularly extending resilient stem engaging and gripping fingers 18. These two fingers 18 may have V-shaped notches 19 formed in their opposed stem engaging ends, so that the two fingers act to essentially surround stem 16. The stem 16 is of an external diameter somewhat greater than the size of the central opening formed within the nut between arms 18, so that those arms may be resiliently deflected outwardly by the stem as the nut is put in position about the stem. The resilience of arms 18 then urges them tightly against stem 16, so that the relatively sharp inner V-shaped edges 19 of arms 18 bite into the stem at 20, and positively lock the nut against accidental removal from the stem.

The nut and engaging stem described above are both of a conventional construction. The novelty of the present invention resides in the provision of a unique tool 21 for removing nut 10 from the stem. This tool includes a handle 22, typically of the illustrated essentially cylindrical configuration, and a helical nut engaging member 23. Handle 22 may typically be formed of a suitable substantially rigid resinous plastic material, such as cellulose acetate plastic, as sold by Tennessee Eastman Corp. under the trade name "Tenite." The outer surface of handle 22 may be knurled or otherwise irregularized at 24, typically essentially circularly about the axis of the handle and helical member 23, to facilitate turning of the handle about the axis of helical element 23 by a user.

Helical member 23 is attached to the first end 25 in fixed relation to handle 22, preferably by embedding that end of the element directly within the material of the handle. The helical member is formed of a relatively stiff but preferably slightly resiliently deformable material, and for best results comprises essentially a stiff coil spring formed of a suitably stiff but somewhat deformable resilient spring steel. This spring steel desirably has a hardness between about 60 and 62 on the Brinell scale. As will be understood, the stiffness of the spring is required in order to assure sufficient strength to remove a nut even though an excessive amount of foreign matter, such as automobile underseal, may have cemented the nut in place.

Helical element 23 terminates outwardly in an outer free end 26, which in the normal condition of the spring is spaced axially from the adjacent turn of the spring. This free end portion 26 of element 23 is progressively tapered in axial thickness from a point 27 to the extreme tip 28 of the element. For thus tapering the end of element 23, that end portion of the element preferably has a flat end face 29 extending essentially transverse, and for best results directly transversely, of the axis a of the tool and its helical element. By virtue of the provision of this transverse end face 29 on the end portion of helical element 23, the extreme tip 28 of element 23 becomes a rather sharp point. The internal diameter of coil spring 23 is sufficiently great to permit reception of the coil spring about the stem 16 of the fastener assembly with which the device is to be used. Preferably, the internal diameter of the spring is somewhat greater than the stem, to assure complete freedom of movement of the tool into its active position about the stem.

To define the end surface 29 somewhat more broadly, this surface should desirably have a substantially zero helical pitch (preferably exactly zero), so that as surface 29 advances toward its extremity, it does so without substantial axial advancement (preferably without any axial advancement). This surface 29 therefore has a reduced pitch as compared with the helical pitch of the rest of the coiled member, and particularly as compared with the pitch of that portion of the coiled member which directly adjoins and merges with the tapered end portion 26. Also, except at the location of flat end surface 29, the material of member 23 is substantially circular in cross section (see Fig. 5). This circular curvature continues along the axially inner side of end portion 26 (the side facing toward the handle and in the opposite axial direction from surface 29).

In using the illustrated tool 21, a user holds handle 22 of the tool by means of its irregularized portion 24. Holding the tool in this manner, it is manipulated to move helical element 23 axially into position about the outer end portion of stem 16. The helical element is advanced onto the stem to a position in which flat end surface 29 of element 23 engages one of the side base portions 30 of nut 10, with the tip end 28 of element 23 received axially inwardly beyond an adjacent one of the angular stem gripping fingers 18 (see Fig. 3). The tool is then rotated about its axis and the axis of stem 16, in a counter-clockwise direction as seen in Figs. 3 and 4, to advance end portion 26 of helical element 23 circularly into its Figs. 4 and 5 position of reception beneath one of the fingers 18. The axial thickness of tapering end portion 26 of element 23 increases to a thickness greater than the axial spacing between side portion 30 of nut 10 and angular finger 18 of the nut at the point at which the tapering end of element 23 is received axially between these two parts. Consequently, rotation of element 23 to the Fig. 5 position acts to wedge the engaged finger 18 axially outwardly away from side portion 30 of the nut to thus move finger 18 out of tight holding engagement with stem 16. This of course releases the nut, so that the operator may pull the nut axially outwardly from about the stem, by pulling outwardly the tool 21 which is interengaged with the nut. If the nut can not be easily pulled outwardly, the tool may be turned through a plurality of complete turns, to gradually and progressively cam the nut entirely off of the stem. Also, even though the stem 11 may be a threaded screw or bolt, as sometimes occurs, the left hand or counter-clockwise turning action can not tend to tighten the nut onto the stem, but instead can only tend to unscrew the nut (assuming that the stem has right hand threads).

Figs. 6 to 9 illustrate a second form of the invention, which functions in essentially the same manner as the Figs. 1 to 5 form, but in which the manner of construction of handle 31 and helical member 32 differs somewhat from the construction of the corresponding parts 21 and 23 in Figs. 1 to 5. In Figs. 6 to 9, the handle 31 takes the form of a rigid preferably metal part which is cup shaped and is desirably annular (about axis 33 of the tool) except in so far as the annular configuration of the handle is interrupted by the various irregularities and nonannular surfaces which are specifically described below. Internally, the body 31 contains a recess 34, having a cylindrical wall 35 centered about axis 33. The inner end of recess 34 is defined by a transverse wall 36, extending directly perpendicularly with respect to axis 33.

The helical member 32 has essentially the same rigidity or stiffness as in Figs. 1 to 5, but is so shaped as to have a somewhat different configuration for facilitating its attachment to the type of body represented at 31. Specifically, the helical spring-like member 32 has a number of turns 37 at its inner end which are closely wound, and are in direct abutting engagement with each other. These closely wound turns 37 are received within recess 34 in body 31, with the end one of the turns abutting axially inwardly against transverse wall 36. Projecting from wall 36, handle 31 carries an integral lug 38, against which the end 39 of spring member 32 abuts in a manner effectively transmitting left hand rotation from handle 31 to helical member 32. The external diameter of turns 37 of member 32 corresponds substantially to the internal diameter of wall 35 of the handle, to thus effectively confine and locate the member 32 relative to the handle. Member 32 is retained against withdrawal axially outwardly from within recess 34, by crimping the material of handle 31 radially inwardly tightly against the end ones of the turns 37 at a series of circularly spaced locations 40. This crimping action forms a very tight frictional connection between parts 31 and 32, effectively holding them against disassembly.

Axially outwardly beyond body 31, the helical member 32 has a number of turns 41, which are not closely wound and in direct interengagement as in the case of turns 37, but which are instead so formed that adjacent turns are spaced axially apart, with the end portion of the outer one of these turns having a surface 42, which corresponds to surface 29 of Figs. 1 to 5, being a zero pitch, and preferably being planar and extending directly transversely of axis 33. In this form of the invention, and in each of the other forms, the end surface 42 or corresponding surface preferably extends or continues through at least about one-third of the circular extent of the coiled member about its main axis. Desirably, the outer spaced turns 41 of member 32 are of progressively decreasing diameter as they advance axially outwardly toward the end face 42. Except in the specific respects discussed above, the helical member 32 has the same characteristics, and functions the same, as member 23 of Figs. 1 to 5.

A user holds the tool of Figs. 6 to 9 by means of an outer generally annular or generally cylindrical gripping surface 43 on handle 31, which surface may be suitably irregularized for facilitating the turning of the tool. More specifically, the irregularities on handle 31 may consist of a series of circularly spaced axially extending grooves 44 formed in the outer surface of the handle. Desirably, the transverse end wall 36 of handle body 31 contains a polygonal, preferably square, opening or recess 45, which is shaped to receive a wrench or tool for assisting in turning the tool 31—32.

Fig. 10 illustrates another variational form of the invention, which is the same as the form of Figs. 6 to 9, except that the outer spaced turns 41a of helical member 32a are shaped to decrease in diameter more abruptly than do the turns 41 of Figs. 6 to 9. As in the case of the Figs. 6 to 9 device, the body 31a of Fig. 10 is crimped inwardly against helical member 32a at locations 40a, which are positioned at approximately the point of juncture between the closely wound interengaging turns 37a and the loosely wound or spaced turns 32a.

The devices of Figs. 6 to 9 and 10 are utilized in exactly the same manner as is the device of Figs. 1 to 5. In the case of all of the three forms of the invention, it is noted that each device is of relatively short axial dimension, in order that it may be utilized in the very confined areas in which "Tinnerman" nuts are frequently employed. Also, this short axial dimension assures most effective transmission of turning force from the handle to the work engaging portions of the tool, without any danger of unwanted deformation, bending or twisting of the helical member 32. In order to attain these objects, it is desirable that the overall maximum axial length 46 of the device (see Fig. 7) be not greater than about twice the maximum transverse dimension 47 of the tool, and particularly of the handle.

It has been mentioned in connection with the Figs. 1 to 5 device that, if the nut 10 happens to be very difficult to remove from stem 11, typically because of the presence of underseal securing the nut in place at the underside of a car, the tool may be turned through several complete turns to progressively cam the nut entirely off of the stem. This same action may be employed in the case of the other two forms of the invention, to cam the nut axially until it may actually engage the handle of the tool. In Fig. 7, I have represented in broken lines at 10 a position to which a nut may thus be moved along helical member 32 toward handle 31. It is noted that in this position the helical member wedges or cams each of the tabs 18 away from the associated base portions 30 of the nut, by reception essentially axially between the tabs and base portions. It is also noted that in this position the nut 10 swings to the illustrated somewhat angular position corresponding to the pitch of the helical member.

I claim:

1. A tool for removing from about a stem a nut having a base portion and a stem gripping portion; said tool comprising a handle, and an elongated essentially helically coiled member carried by said handle adapted to extend helically about said stem for at least about one complete turn and adapted to be turned about said stem by said handle and to engage said nut and remove it from the stem, said coiled member having an outer end portion disposed essentially transversely of the stem axis at an outer end of the tool and spaced from an adjacent turn of said member, said outer end portion being tapered to a reduced axial dimension and being adapted to engage and bear in opposite axial directions against said base and stem gripping portions of the nut, and to thereby wedge said portions of the nut axially apart upon rotation of said member by the handle, whereby the nut is released for removal by said member from about the stem, said end portion of the helically coiled member having an axially outer surface facing essentially axially away from the rest of said member for engaging and bearing against said base portion of said nut, said axially outer surface of said end portion being so shaped as to extend along said end portion of the coiled member toward the extremity of said end portion at substantially zero helical pitch and therefore without substantial advancement axially of the member, said end portion of the coiled member having an axially inner surface of substantial helical pitch at its opposite axial side facing essentially toward the handle to give to said end portion its tapered wedging configuration, and said member having a portion directly adjoining and merging with said end portion which is disposed at a substantial helical pitch greater than said substantially zero pitch of said axially outer surface.

2. A tool as recited in claim 1 in which said coiled member is formed of spring steel and extends helically about said axis for a plurality of turns.

3. A tool as recited in claim 1 in which said coiled member is formed of spring steel and has a helically extending inner end portion embedded in the material of said handle.

4. A tool as recited in claim 1 in which said coiled member is of left hand helical configuration to avoid tightening said nut onto the stem if the latter has right hand threads.

5. A tool as recited in claim 1 in which said coiled member has a plurality of turns axially beyond said handle which are spaced axially apart, and has a plurality of more closely wound turns within and gripped by said handle.

6. A tool as recited in claim 1 in which said coiled member has a plurality of turns axially beyond said handle which are spaced axially apart, and has a plurality of more closely wound turns within and gripped by said handle, said spaced turns of the member being of progressively decreasing diameter toward said end portion of the member.

7. A tool as recited in claim 1 in which said handle contains a recess into which a helically coiled inner end of said member extends, there being a shoulder on said handle and within said recess preventing relative rotation of the handle and member, and said handle being crimped against said coiled member to hold it in the recess.

8. A tool as recited in claim 7 in which said inner portion of the coiled member includes a plurality of unspaced closely wound turns, said member having a plurality of turns beyond said handle which are spaced relatively apart and which progressively decrease in diameter toward said end portion, said body being crimped against the member at substantially the juncture between said unspaced and spaced turns.

9. A tool as recited in claim 1 in which said handle contains a recess into which a helically coiled inner end of said member extends, there being a shoulder on said handle and within said recess preventing relative rotation of the handle and member, and said handle being crimped against said coiled member to hold it in the recess, said handle having an end wall disposed transversely across an end of said recess and against which said coiled member abuts and containing a polygonal recess for engagement by a wrench to turn the tool.

10. A tool as recited in claim 1 in which said handle is of essentially circular external configuration, centered about the axis of said spring, and is externally irregularized about its outer surface to facilitate manual turning thereof.

11. A tool as recited in claim 1 in which said handle and coiled member together have a combined axial dimension which is not greater than about twice the greatest transverse dimension of the handle.

12. A tool for removing from about a stem a nut having a base portion and a stem gripping portion; said tool comprising a handle, and an elongated essentially helically coiled member carried by said handle adapted to extend helically about said stem for at least about one complete turn and adapted to be turned about said stem by said handle and to engage said nut and remove it from the stem, said coiled member having an outer end portion disposed essentially transversely of the stem axis at an outer end of the tool and spaced from an adjacent turn of said member, said outer end portion being tapered to a reduced axial dimension and being adapted to engage and bear in opposite axial directions against said base and stem gripping portions of the nut and to thereby wedge said portions of the nut axially apart upon rotation of said member by the handle, whereby the nut is released for removal by said member from about the stem, said end portion of the helically coiled member having an axially outer surface facing essentially axially away from the rest of said member for engaging and bearing against said base portion of said nut, said axially outer surface of said end portion being substantially planar and extending substantially directly transversely of the axis of said helical member on which said surface is formed, said end portion of the coiled member having an axially inner surface of substantial helical pitch at its opposite axial side facing essentially toward the handle to give to said end portion its tapering wedging configuration.

13. A tool as recited in claim 12, in which said coiled member extends about said axis for a plurality of turns and is of left hand helical configuration.

References Cited in the file of this patent

UNITED STATES PATENTS

| | | |
|---|---|---|
| 1,603,771 | Hokanson | Oct. 19, 1926 |
| 1,758,504 | English | May 13, 1930 |
| 2,700,910 | Van Niel | Feb. 1, 1955 |
| 2,802,382 | Adams | Aug. 13, 1957 |